United States Patent [19]

Schwiesow

[11] 4,449,823
[45] May 22, 1984

[54] DEVICE FOR MEASUREMENT OF THE SPECTRAL WIDTH OF NEARLY MONOCHROMATIC SOURCES OF RADIANT ENERGY

[75] Inventor: Ronald L. Schwiesow, Boulder, Colo.

[73] Assignee: The United States of America as represented by the Secretary of Commerce, Washington, D.C.

[21] Appl. No.: 348,575

[22] Filed: Feb. 12, 1982

[51] Int. Cl.³ .............................................. G01B 9/02
[52] U.S. Cl. .................................................. 356/346
[58] Field of Search ................ 356/346, 349, 357, 358

[56] References Cited

PUBLICATIONS

Goldsmith et al., "Precision Interferometer Calibration Technique . . . " *Applied Optics,* vol. 18, No. 12, pp. 1983-1987, Jun. 1979.
Schwiesow et al., "Temperature Profiling by Rayleigh--Scattering Lidar," *Applied Optics,* vol. 20, No. 11, pp. 1972-1979, Jun. 1981.

*Primary Examiner*—William L. Sikes
*Assistant Examiner*—Matthew W. Koren
*Attorney, Agent, or Firm*—Eugene J. Pawlikowski; Alvin J. Englert

[57] ABSTRACT

A method and apparatus for measuring the spectral width of a nearly monochromatic source of radiant energy, when the general shape of the spectral line is known. Portions of the signal beam from the source of energy are introduced into two parallel interferometers. In each interferometer, each beam is further divided into parts, one part being delayed with respect to the other part, and the parts then being recombined. The delays or optical path difference are chosen such that each output is a relative extremum. The optical path differences are also chosen such that the two inteferometers have different path differences. The ratio of transmissions of the signal by the two interferometers using the proper optical delays is an indication of the spectral width of the source if the spectral distribution is assumed or approximated.

9 Claims, 3 Drawing Figures

4,449,823

DEVICE FOR MEASUREMENT OF THE SPECTRAL WIDTH OF NEARLY MONOCHROMATIC SOURCES OF RADIANT ENERGY

BACKGROUND OF THE INVENTION

The present invention relates generally to spectrometers used to determine the spectral characteristics of a source of radiant energy and specifically, to a device to measure efficiently the spectral width of a spectrally narrow source.

High resolution measurements of the spectral width of a nearly monochromatic source of radiant energy are most commonly made with a scanning Fabry-Perot interferometer. The Fabry-Perot acts as a tunable filter, transmitting the energy from the source that is in the passband of the interferometer at any scan position (frequency band). If the interferometer has a passband that is significantly narrower than the linewidth of the source, scanning the interferometer will measure the spectrum of the source (radiant power vs. wavelength or frequency).

An alternative approach to the scanning filter technique is to use heterodyne spectroscopy in which a monochromatic local oscillator that is spectrally narrower than the source to be measured is mixed with radiation from the signal source. The resulting beat frequency is then measured to determine the spectrum of the unknown source.

Instead of a scanning filter operating in frequency space, Michelson used the two-beam interferometer bearing his name and examined the interference contrast (variation in intensity vs. optical delay) as a function of scan distance to infer the linewidth (or sometimes existence of a spectral doublet) of a radiant source. Scanning Michelson interferometers are now highly developed and available for measuring the spectrum of a complex radiant source by means of Fourier transform spectroscopy. A Fourier transform is used to convert the interferogram (radiant power vs. optical path difference between the two arms of the interferometer) to a spectrum.

One disadvantage of these scanning interferometers is that, during the scanning period, the source could fluctuate and this would show up in the spectral width measurement, degrading its accuracy. Additionally, the mechanical hardware required in a scanning interferometer is extremely complex and must be very precise in its movement of the mirrors in order to prevent changes in mirror inclination while permitting changes in the optical path length.

A further disadvantage of the prior art scanning interferometer (especially the Fabry-Perot interferometer) is the relatively small amount of radiant power which is transmitted by the interferometer onto the detector. Because the Fabry-Perot interferometer acts as a spectral filter, only the radiant energy in the narrow spectral interval is transmitted to the detector.

SUMMARY OF THE INVENTION

In view of the above and other disadvantages of the prior art, it is an object of the present invention to provide a method and apparatus for the measurement of the spectral width of a nearly monochromatic source of radiant energy when there is some a priori information about the general shape of the spectral line.

Another object of the present invention is to provide a method and apparatus for making a linewidth measurement in a manner that uses the radiation incident on the measuring device in an efficient manner.

A further object of the present invention is to provide a method and apparatus for obtaining data on the spectral width of a nearly monochromatic source without scanning the optical path difference in an interferometer.

A still further object of the present invention is to provide a method and apparatus for linewidth measurements on a source in the presence of interfering radiation of a different spectral character (spectrally wider or narrower) than the source of interest.

The above and other objects are achieved by providing a fixed, compound interferometer with two radiant power outputs. In a preferred embodiment, radiant energy from a source of interest, which may include interfering radiation, is incident at the entrance of the device and made substantially collimated by a lens or other suitable means. The signal beam is divided into two approximately equal beams and directed into two interferometers of the two-beam, Michelson type.

The two interferometers in the device are set to different, fixed values of the optical path difference between the two arms of each interferometer. One path difference is set at a point where the contrast (variation in intensity versus optical delay) in the interferogram has the greatest change with changes in the linewidth of the source. The other interferometer is set to a larger optical delay where the contrast has been reduced to a very small value, i.e., where the interferometer transmission of the source radiation is approximately ½ and does not change significantly with increases in the optical path difference between the two arms of the interferometer or with changes in the line width of the source. The optical path differences should be held at a local extremum of the interferometer transmission (both at either a minimum or maximum).

The ratio of the output of the shorter delay interferometer to the output of the longer delay interferometer is a direct measure of the spectral width of the nearly monochromatic radiant source of interest, if the general shape (e.g., Gaussian or Lorentzian) of the spectral line is known or can be assumed from other a priori information. In practice, the two interferometers are calibrated to each other with the aid of some spectrally broad test source, which may be background interference radiation, for example. A spectrally broad source will result in a theoretical ratio of the two interferometer outputs of unity (1), and any departure from unity due to imperfections in beam splitters, mirrors or detectors can be determined and used to correct the data on the narrow-line source of interest.

BRIEF DESCRIPTION OF THE DRAWINGS

A more complete appreciation of the invention and the attendant advantages thereof will be readily apparent by reference to the accompanying drawings wherein.

DETAILED DESCRIPTION OF THE PREFERRED EMBODIMENT

The present invention is a device for measuring the linewidth of a source that uses neither a spectral filter nor a scanning Michelson interferometer to infer linewidth. Rather, the instant invention uses two fixed Michelson interferometers to infer linewidth even in the presence of interfering sources of radiant power that have spectra both wider and narrower than the source of interest. One example of such a source of radiant power is scattering from a gas (e.g., the atmosphere) when illuminated with a single-frequency laser. Background light will have a broader spectrum, and scattering from aerosols will have a narrower spectrum, than scattering from molecules. The general shape of a molecular-scattering spectrum is known. Another example of a nearly monochromatic source (within some spectral region) is the emission of atoms or molecules previously raised to an excited energy level by some means as in a discharge lamp or the upper atmosphere.

Figure 1:
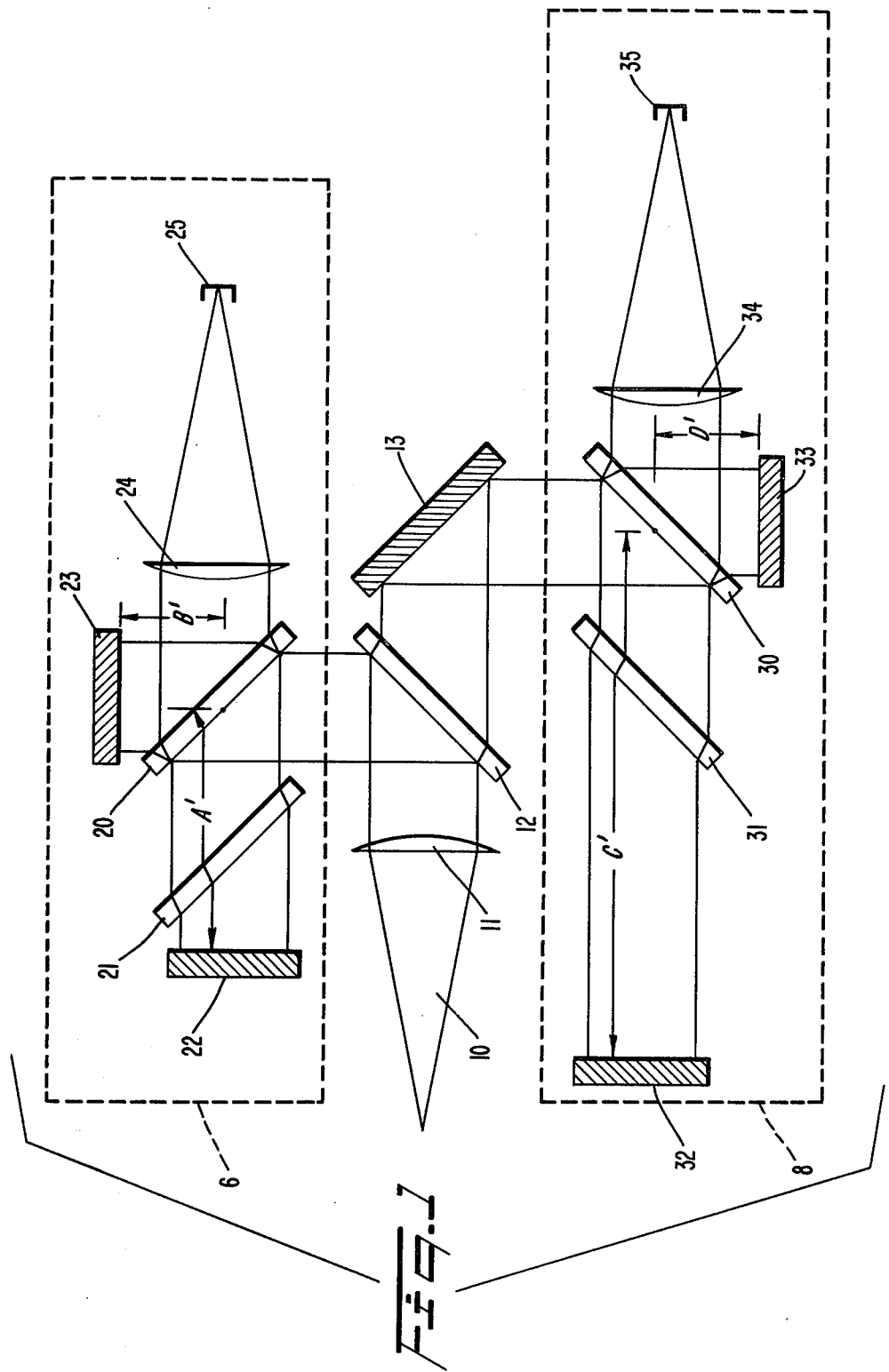
FIG. 1 is a schematic diagram showing the combined two-arm Michelson interferometers used for measuring the spectral width of nearly monochromatic sources of radiant energy.

Referring now more particularly to the drawings, wherein like numerals represent like elements throughout the several views, FIG. 1 illustrates the present optical arrangement. A technique of the instant invention comprises illuminating a pair of two-arm interferometers with radiation (perhaps combined with other interfering radiation) from the source for which it is desired to measure spectral linewidth. The optical path differences in the two interferometers are carefully chosen, fixed and known, and are a key feature of the invention. The spectral linewidth is determined from the ratio of powers transmitted by the two interferometers.

Light from the source of interest is incident in beam 10, which is substantially collimated by lens 11 or other standard optical technique. The collimated signal beam is divided into two approximately equal beams by beamsplitter 12, and the two beams are directed separately into interferometer 6 and with the aid of mirror 13, interferometer 8. The two interferometers are of the two-beam Michelson type of fairly standard configuration. Radiation at the interferometer input is divided into two approximately equal beams by beamsplitters 20 and 30, respectively. One beam in each interferometer is reflected from mirrors 23 and 33, respectively, and the other beam in each interferometer is reflected from mirrors 22 and 32, respectively. Compensating plates 21 and 31 are optional and may be used to make the two arms similar. The distances A' and B' are different in interferometer 6 and likewise, the distances C' and D' in interferometer 8. Note also that the differences in distances A'-B' and C'-D' are also different, i.e., A'-B'$\neq$ C'-D'. After traversing different optical path lengths, the two beams, one delayed with respect to the other, in each interferometer are combined at beamsplitters 20 and 30, and are directed to each interferometer output. The radiant power at the output is focused by lenses 24 and 34 or other suitable means to detectors 25 and 35. The ratio of radiant power detected by detector 25 to that detected by detector 35 is a measure of the spectral linewidth of the source in the manner outlined below.

Figure 2:
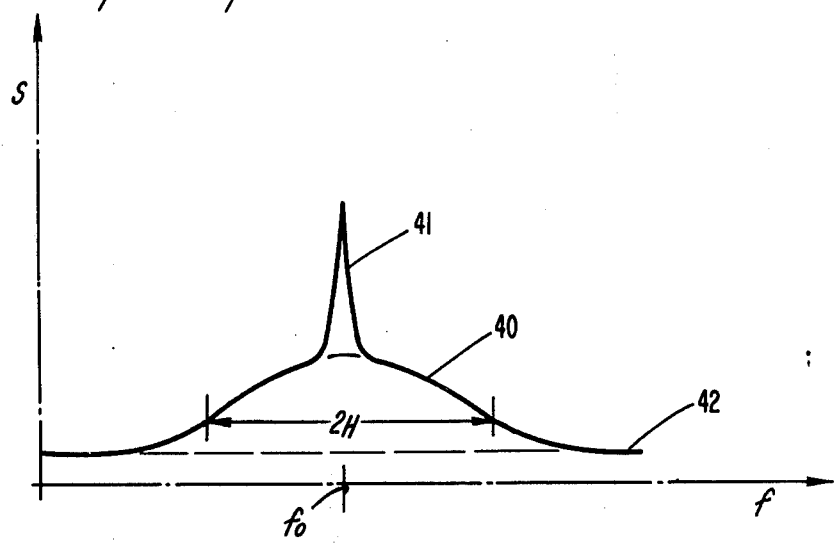
FIG. 2 is a graph of the radiant power S versus frequency f (spectrum) of a typical source with interfering radiation of different linewidths.

As an aid in clarifying the invention, FIG. 2 shows a schematic example of the spectrum of radiant energy that might compose beam 10 in FIG. 1 from the source to be analyzed. The spectrum is a plot of radiant power S vs. frequency f. The spectrum 40 from the source of interest has a characteristic halfwidth H. Interfering radiation is represented by spectrum 41, which has a linewidth much less than H, and by spectrum 42, which has a linewidth much greater than H. All three contributions 40, 41 and 42 add linearly to produce the overall spectrum that is analyzed by the method of the instant invention to obtain a value for H, the spectral linewidth of the source. As an example of such a spectral signal source 10, consider laser light of frequency $f_o$ backscattered from the atmosphere. The received signal will contain a spectrum 40 from molecular scattering in addition to a narrower spectrum 41 from scattering from particulates in the atmosphere and a wider spectrum 42 from background skylight. The width H of spectrum 40 is proportional to the square root of kinetic temperature of the molecules, so that a measurement of H by this invention measures the temperature of the scattering molecules.

Figure 3:
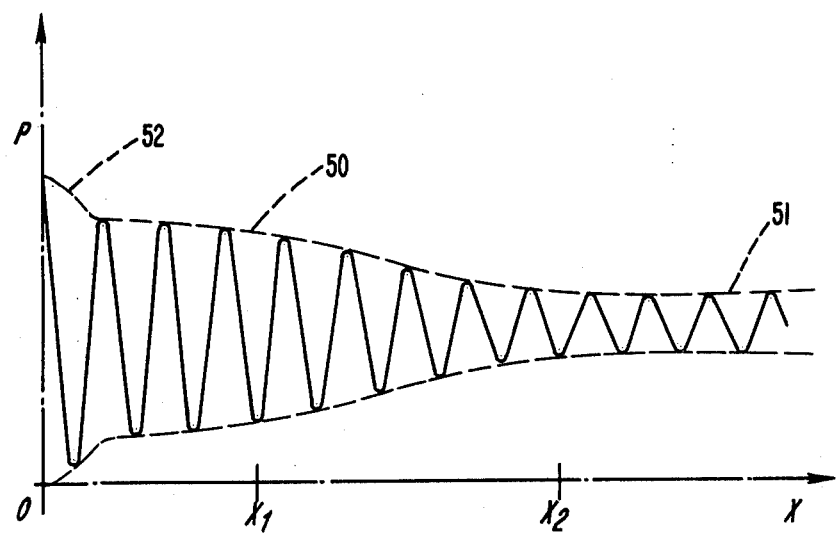
FIG. 3 is a graph of transmitted power P at various optical path differences X for a two-beam (Michelson) interferometer when radiant energy with the spectrum of FIG. 2 is incident thereon.

If the spectrum 40 plus 41 plus 42 from FIG. 2 is incident at the entrance aperture of one two-beam (Michelson) interferometer, the radiant power P transmitted by the interferometer is a function of optical path difference X between the two arms of the interferometer and is shown schematically as the interferogram in FIG. 3. The distance difference for interferometer 6 is A'-B' and for interferometer 8 is C'-D'. At a path difference of 0, the transmission is essentially 1, and the transmission approaches ½ for very large values of optical path difference. As the optical path difference increases from 0, the transmission of the interferometer goes through a series of relative minima and maxima as sketched in the interferogram. Extrema of the interferogram lie within an envelope, shown in dashed lines in FIG. 3, which is symmetric about the transmission equals ½ line. Actually, the interferogram oscillates more rapidly compared to the decrease in width of the dashed envelope than shown, but the closeness of the extrema has been reduced in FIG. 3 for clarity.

For an analytic example, consider a spectral signal given by:

$$S(f) = (A/H\pi^{\frac{1}{2}}) \exp[-(f_0 - f)^2/H^2] + \quad (1)$$
$$(B/\beta H\pi^{\frac{1}{2}}) \exp[-(f_0 - f)^2/(\beta H)^2] +$$
$$(C/\gamma H\pi^{\frac{1}{2}}) \exp[-(f_0 - f)^2/(\gamma H)^2].$$

The first term represents spectrum 40 in FIG. 2, the second term represents 41 and the third represents 42. Coefficients A, B and C are the maximum radiant power from the source of interest, narrowband interference and wideband interference, respectively. Equation (1) expresses each component of the spectrum as a Gaussian. Dimensionless factors $\beta << 1$ and $\gamma >> 1$ relate the linewidth of narrowband and broadband interference, respectively, to the linewidth of the source of interest, which is to be measured. Frequency $f_0$ is the center frequency of the spectrum of interest. The interferogram of the signal with the spectrum of equation (1) is given by:

$$P(X) = (\tfrac{1}{2})(A + B + C) + (\tfrac{1}{4})(\exp[+i\,2\pi f_0 X/c] + \quad (2)$$
$$\exp[-i\,2\pi f_0 X/c]) \cdot \{A \exp[-(\pi f_0\,XH/c)^2] +$$
$$B \exp[-(\pi f_0\,X/\beta H/c)^2] + C \exp[-(\pi f_0\,X\gamma H/c)^2]\}.$$

wherein c is the speed of light. This is a relatively rapid cosine oscillation damped by a compound Gaussian envelope plus a constant. Note that $P(O)=A+B+C$, the radiant power incident on the interferometer, and $P(\infty)=\frac{1}{2}(A+B+C)$. The envelope of the interferogram of equation (2) is sketched as the dotted line in FIG. 3. The section of the envelope 52 is a result of the wideband spectrum 42, as seen from the damping factor for wideband radiation in equation (2), which contains the factor $\gamma >> 1$ so that the exponential rapidly approaches zero with increasing X. The section of the envelope 51 is a result of the narrowband spectrum 41, because the damping factor for narrowband radiation in equation (2) contains a factor $\beta << 1$ so that the exponential decays very slowly with increasing X or is almost constant. The spectrum 40 of the source of interest has a linewidth that is postulated to be intermediate between the two types of interfering radiation. The section of the envelope 50 is a result of the spectrum 40 of the source with linewidth H, which is to be measured. Note that the envelope 50 of the interferogram delays more slowly than the envelope 52 of wideband interference with spectrum 42, and decays more rapidly than the envelope 51 of narrowband interference with spectrum 41.

One unique feature of the instant invention compared to previous practice is that interferometric measurements are made only at extrema of the interferogram. The reason that this is important can be seen from equation (2), where terms containing H appear only in the expressions for the envelope function. Thus the interferometers are fixed at optical path differences corresponding to extrema of the oscillatory factor.

Another unique feature of the present invention compared to previous practice is that measurements on the interferogram are made at only two different values of optical path difference (corresponding to distances $A'-B'$ and $C'-D'$) rather than at a multitude of different optical path differences as in a scanning interferometer. As sketched in FIG. 3, one value for path difference is $X_1$, (representing twice $A'-B'$), which is chosen to be large enough that $\exp[-(\pi f_0 X_1 \gamma H/c)^2] \approx 0$. Thus one value, measured with the source of interest off or blocked, $P'(X_1)$, can give information on C, and $\gamma$ may be neglected for properly chosen values of $X_1$ and $X_2$. Another criterion for the value $X_1$ is that it be chosen near where the envelope changes most rapidly with changes in linewidth H. This maximum-sensitivity point can be obtained from equation (2). However, one value $P(X_1)$ with the source on cannot give values for both A and H. In the general case, A is not known a priori and a second simultaneous measurement must be made at a properly chosen delay $X_2$, representing twice $C'-D'$. It is desirable that $X_2$ be chosen at a point where there is a minimal variation in intensity versus optical delay. If $X_2$ is chosen so that $\exp[-(\pi f_0 X_1 H/c)^2] >> \exp[-(\pi f_0 X_2 H/c)^2] \approx 0$, then A can be determined with the help of $P(X_2)$. The actual values chosen for $X_1$ and $X_2$ depend upon the uncertainty which can be tolerated.

A further unique feature of a preferred embodiment of this invention is that measurements are made at minima of the interferogram. If $X_2$ is properly chosen to be not too large so that $\exp[-(\pi f_0 X_2 \beta H/c)^2] \approx \exp[-(\pi f_0 X_1 \beta H/c)^2] \approx 1$, which is possible because $\beta << 1$, then at a minima, $P(X_1)$ and $P(X_2)$ are almost independent of B and $\beta$.

Yet another unique feature of the present invention compared to previous practice is that measurements at (two) different optical delays are made on the source simultaneously. In contrast to scanning methods, this means that the spectral width measurement is not affected by fluctuations in the radiant power output of the source nor by changes in the transmission of the medium between the source and the analysis device.

In practice we use the method of the invention to measure $P'(X_1)$ and $P'(X_2)$ at minima with the source of interest off, and $P(X_1)$ and $P(X_2)$ at minima with the source on. From $P'(X_1)$ and $P'(X_2)$ we obtain a value for C and a relative calibration of the two complete interferometers. From $P(X_1)$ and $P(X_2)$ together with C and the calibration we determine A and the value of interest H, because B and $\beta$ have been dropped as a consequence of using minima.

The example of the invention is shown with a Gaussian spectral line distribution, but a similar analysis is appropriate for any other nearly monochromatic source lineshape for which the general shape of the source spectrum is known. For many purposes, a Gaussian approximation gives a usefully accurate estimate for H from the measurement device.

A unique feature of the present invention is the use of two interferometers in parallel to process the signal radiation, rather than the use of a single scanning interferometer. Another unique feature in accordance with the principles of the invention is to fix the optical path differences in the interferometers and to fix the differences at an extrema of the interferogram. Thus it is clear that the invention measures the spectral width of a nearly monochromatic source when there is some a priori information about the general shape of the spectral line. Further, the invention works with mechanically simple hardware. In contrast to a scanning (Fabry-Perot) spectral filter, which passes only a narrow spectral interval compared to the linewidth of the source, the instant invention transmits on the average one half of the radiant power incident on the device, thus using the signal power in an efficient manner.

A practical application of the present invention is discussed in an article entitled "Temperature Profiling by Rayleigh-Scattering Lidar", published June 1981, in *Applied Optics*, Volume 20, No. 11, pages 1972–1979, the contents of which are herein incorporated by reference. Additionally, a practical example of the values of the terms appearing in equation (2) follows from an example in which the spectrum of interest 40 comprises air at room temperature. The power coefficients A, B and C are 1.0, 1.0, and 0.1 respectively. The interfering spectra have width coefficients $\beta$ and $\gamma$ of $10^{-2}$ and 10, respectively. The center frequency $f_0$ is $615 \times 10^{12}$ hertz (the frequency of an argon-ion laser). One of ordinary skill in the art will approximate $X_1$ and $X_2$ based upon a first guess of scattered light from the air at room temperature and supply the values $X_1$ and $X_2$ to the equations $P(X_1)$, $P(X_2)$, $P'(X_1)$ and $P'(X_2)$ which are then solved for the half width at the 1/e intensity point on the interferogram which was previously identified as H. Even if the values $X_1$ and $X_2$ are off by 10 or 20 percent, the half width H will be accurate to within a few percent. At this point, because the half width is fairly closely known, $X_1$ and $X_2$ can be adjusted slightly to correspond with this "known" half width to obtain an even more accurate determination of H. Thus, the above iterative procedure will permit a determination of H without the necessity of determining $X_1$ and $X_2$ accurately beforehand. Finally, in the example shown above, $X_1$ is equal to 5.64 centimeters which corresponds to a difference in mirror spacing in the arms of one Michelson interferometer of 2.82 centimeters. Value $X_2$ on the other Michelson interferometer is set to an optical path difference of 16.9 centimeters which results in a mirror spacing difference in the two arms of 8.45 centimeters.

Although the above invention has been disclosed with reference to preferred embodiments, it is not limited thereto as many modifications and improvements may become obvious to those of ordinary skill in the art in view of the above teachings. For example, in certain applications, it may be desirable to use the relative maxima rather than relative minima in the adjustment of the optical path differences in the interferometers. Additionally, interferometers other than two-arm Michelson interferometers may be used, although some modification of the apparatus and mathematical assumptions may be necessary. Although specific examples have been shown, it will be obvious to those of ordinary skill in the art that the values $X_1$ and $X_2$ may differ depending upon the interferometers chosen, the relative maxima or minima chosen and the characteristics of the signal of interest. Therefore, the above invention is limited only in accordance with the appended claims.

The embodiments of the invention in which an exclusive property or privilege is claimed are defined as follows:

1. A method of measuring the spectral width of a nearly monochromatic source of radiant energy whose spectral distribution is known or assumed, comprising the steps of:
    dividing a beam from said nearly monochromatic source of radiant energy into two separate beams;
    supplying each of said separate beams to separate interferometers, said interferometers each having an output which varies in accordance with an optical path difference taken by the beam internal to the interferometer;
    adjusting said interferometers such that the optical path difference in one interferometer is different from the optical path difference in the other interferometer; and
    deriving said spectral width of said nearly monochromatic source of radiant energy by evaluating the signal transmission from one interferometer with the signal transmission from the other interferometer.

2. The method according to claim 1, wherein said adjusting step further includes the step of setting both interferometers to optical path lengths which correspond to a relative extremum of an interferogram of each interferometer.

3. The method according to claim 2, wherein said relative extremum in each interferogram is a relative minimum of the interferogram.

4. The method according to claim 2, wherein said source of radiant energy has an interferogram with an envelope and said adjusting step comprising setting the optical path difference in one interferometer to a point $X_1$ where the envelope changes most rapidly with changes in spectral width and in the other interferometer to a larger value, point $X_2$, where the envelope changes only slightly with the changes in the spectral width.

5. An apparatus for measuring the spectral width of a nearly monochromatic source of radiant energy whose spectral distribution is either generally known or is generally assumable, said apparatus comprising:
    a first interferometer having a beam path providing a first optical path difference;
    a second interferometer having a beam path providing a second optical path difference, said first optical path difference being different from said second optical path difference;
    means for supplying a portion of said radiant energy to each of said interferometers;
    means for deriving said spectral width of said nearly monochromatic source of radiant energy by evaluating the output from one interferometer with the output from the other interferometer.

6. The apparatus according to claim 5, wherein each of said interferometers operates at a relative extremum of the interferogram.

7. The apparatus according to claim 6, wherein said extremum is a relative minimum.

8. The apparatus according to claim 7, wherein said first optical path difference, $X_1$, is equal to that difference at which the variation in interferogram amplitude per change in spectral width is greatest and said second optical path difference, $X_2$, is equal to that difference at which the variation in interferogram amplitude per change in the spectral width is minimal.

9. The method according to claim 4, wherein said deriving step comprises the steps of:
    forming a ratio of the signal transmission from one interferometer with the signal transmission from the other interferometer;
    correcting said ratio for any interferometer differences and for any non-monochromatic radiant energy received; and
    solving the interferogram equation for spectral width of the nearly monochromatic source of radiant energy.

* * * * *